Sept. 11, 1928.
R. B. BEAUCHAMP
1,684,167
SPEED CHANGING MECHANISM
Filed Sept. 30, 1925  3 Sheets-Sheet 1
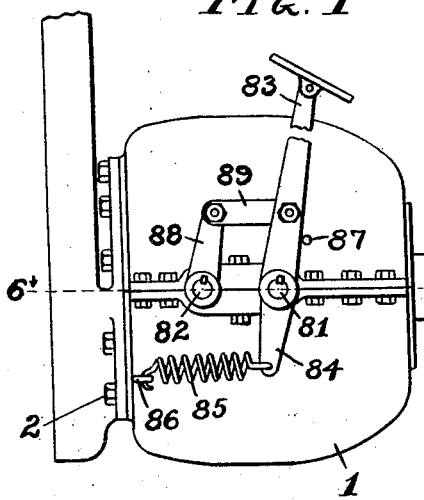
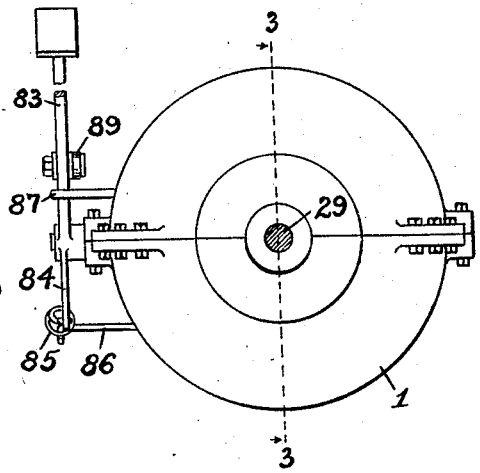
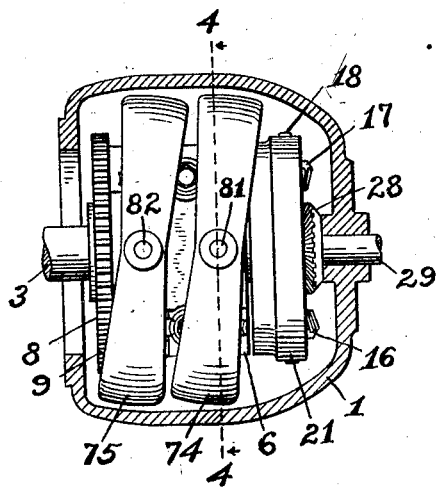
Inventor
R. B. Beauchamp
By G. E. Dunstan,
his Attorney Sept. 11, 1928.
R. B. BEAUCHAMP
SPEED CHANGING MECHANISM
Filed Sept. 30, 1925   3 Sheets-Sheet 3
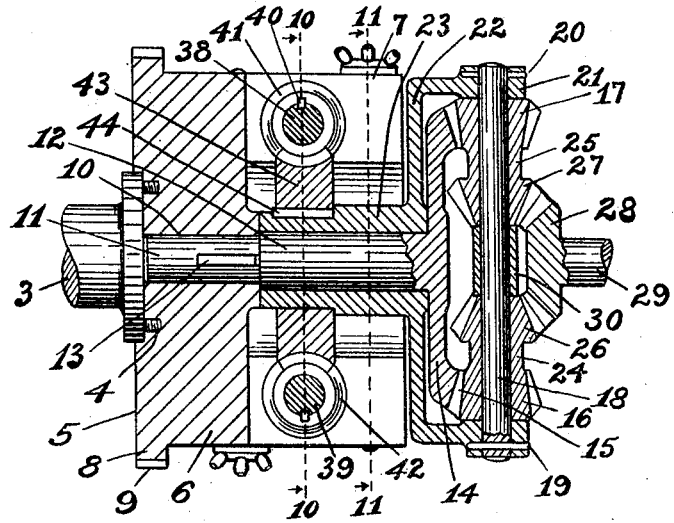
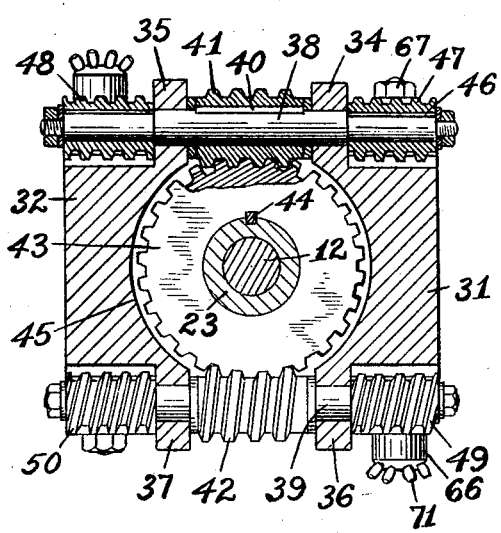
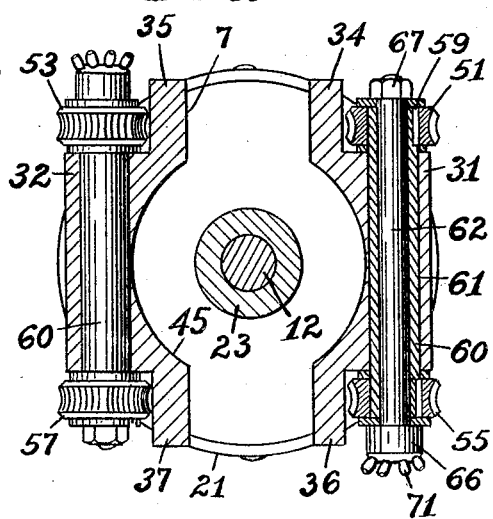
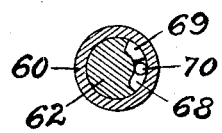
Inventor
R. B. Beauchamp Patented Sept. 11, 1928.

1,684,167

UNITED STATES PATENT OFFICE.

ROBERT B. BEAUCHAMP, OF EAST CLEVELAND, OHIO.

SPEED-CHANGING MECHANISM.

Application filed September 30, 1925. Serial No. 59,548.

This invention relates to speed changing mechanism, and has for its principal object to provide mechanism whereby the speed of a driven shaft relative to that of a driving shaft may be changed and controlled with great ease by the operator simply moving a lever in a straight-line direction.

Another object of the invention is to provide a mechanism of the above character which is practical in construction and will cause change of speed by a slight forward movement of the operating lever.

A further object of the invention is to provide a speed changing mechanism of the above character, which is especially adapted to the transmission mechanism of an automobile for simplifying the starting thereof, by simply moving the operating lever in a single straight forward direction to attain various speeds instead of as is the usual practice of moving the lever forward in one direction for low speed; next in the opposite direction, then laterally, and continuing in the same direction for intermediate speed; and finally again in the first direction for high speed.

With the above and other objects in view, as will be understood, the invention will be hereinafter fully described as illustrated in the accompanying drawings, and the novel features thereof will be distinctly pointed out in the appended claims.

Figure 5:
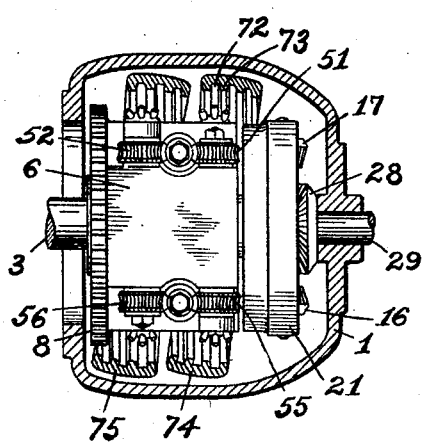
Figure 6:
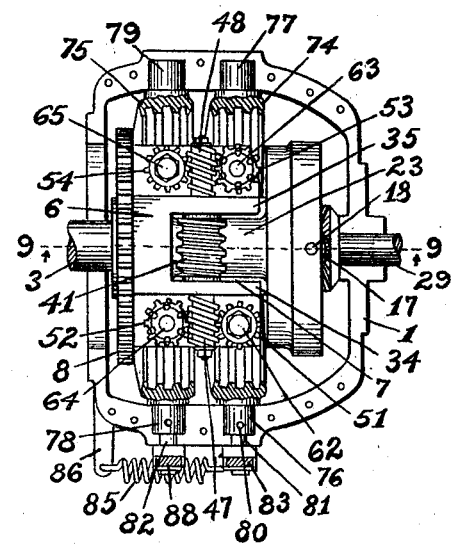
Figure 7:
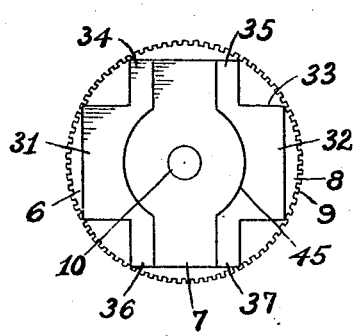
Figure 8:
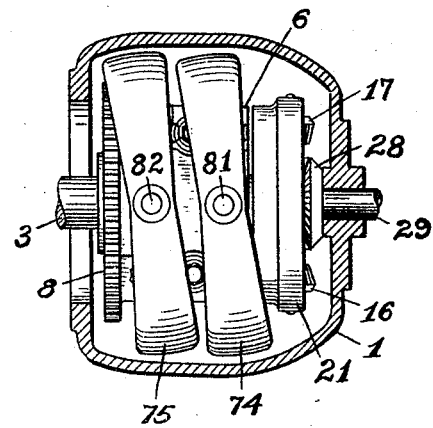

Figure 1 illustrates a side elevation of a speed changing mechanism constructed in accordance with my invention, Fig. 2 is a rear end view of the same, Fig. 3 is a longitudinal sectional view through the housing, taken on line 3—3 of Fig. 2, the gear-rings being in their rearwardly inclined or normal positions, Fig. 4 is a transverse sectional view through the housing, taken on line 4—4 of Fig. 3, Fig. 5 is a similar view to Fig. 3, the gear-rings being shown in section, Fig. 6 is a longitudinal sectional plan view taken on line 6—6 of Fig. 1, Fig. 7 is a rear view of the block, Fig. 8 is a similar view to Fig. 3, the gear-rings being shown in their other or forwardly inclined positions, Fig. 9 is a longitudinal sectional view of the block and operating mechanism carried thereby, on an enlarged scale, taken on line 9—9 of Fig. 6, Fig. 10 is a transverse sectional view taken on line 10—10 of Fig. 9, Fig. 11 is a transverse sectional view taken on line 11—11 of Fig. 9, and Fig. 12 is a cross sectional view illustrating the sleeve and shaft therein.

Referring to the drawings, 1 represents a housing for the speed changing mechanism, which housing is bolted to the engine at 2. The engine or driving shaft, indicated by 3, is securely fixed at 4 to the forward end 5 of the block 6, which is cut out at its rear end as indicated at 7. The forward end of the block 6 is preferably a circular flange 8, and its periphery is provided with teeth 9 for meshing with the gear of the starter motor as in ordinary practice. The block 6 is provided with a longitudinal opening in alignment with the engine or driving shaft 3, at 10, for receiving the forward reduced end 11 of a shaft 12, which is keyed to said block at 13. Formed integrally with the rear projecting end of the shaft 12, beyond the block 6, is a disc-gear 14, the teeth 15 of which mesh with oppositely arranged idler bevelled pinions 16 and 17. These idler bevelled pinions are rotatably mounted upon a transverse axle 18, which is fixed at 19 and 20 to the peripheral flange 21 of a disc 22 arranged between disc-gear 14 and the rear end of the block 6. The disc 22 is formed integrally with an elongated hub 23, which is rotatably mounted upon the shaft 12. Formed integrally with and connected to the idler bevelled pinions 16 and 17, by necks 24 and 25, and likewise rotatably mounted upon the transverse axle 18, are inner corresponding bevelled pinions 26 and 27 respectively, which mesh with a bevelled gear 28 formed integrally with the driven shaft 29. A spacing sleeve 30 is arranged upon the transverse axle 18 between the inner ends of the bevelled pinions 26 and 27.

Rotary motion is transmitted from the engine or driving shaft 3 to the driven shaft 29, and the speed of the latter shaft changed relative to that of the former shaft by means of the mechanism now to be described. The cut-out 7, at the rear end of the block 6, leaves sides 31 and 32, which are cut down at their upper corners as indicated at 33, thereby leaving narrower sides 34—35 and 36—37. Spindles 38 and 39 are supported in the sides 34—35 and 36—37 respectively, and fixed thereto between said sides by a key indicated at 40, are worms 41 and 42 respectively, the threads of which mesh with a worm-wheel 43 keyed to the hub 23 at 44. The sides 31 and 32 of the block 6 are dished out, as shown at 45, to accommodate the worm-wheel 43. As the threads of the worms 41 and 42 are substantially at right angles to the threads of the worm-wheel 43, the rotary motion of the driving shaft 3 causes the block 6 fixed thereto to rotate, and this rotary motion of the block carries the worms 41 and 42 longitudinally in a circle, and as there is a locking connection between the worms 41 and 42 and the worm-wheel 43, said worm-wheel is rotated with said block. As the worm-wheel 43 is fixed to the hub 23, said hub, the disc 22 and the peripheral flange 21, the transverse shaft 18 and the idler bevelled pinions 16—17 and 26—27 thereon, are also rotated as a unit with the block 6. When all of said parts are thus rotated as a unit, the teeth 15 of the disc-gear 14 are adapted to serve for locking the idler bevelled pinions 16—17 and 26—27 against rotation on the transverse shaft 18. When the shaft 29 is driven as described by the engine or driving shaft 3, the speed of the former shaft is the same as that of the latter shaft.

The changing of the speed of the driven shaft 29 relative to that of the driving shaft 3 is accomplished by the following described mechanism. The spindles 38 and 39 extend beyond the sides 34—35 and 36—37 respectively, and keyed thereto, as indicated at 46, are worms 47—48 and 49—50 respectively, and nuts are preferably provided at the ends of said spindles. Said worms mesh with and are adapted to be driven by worm-pinions 51—52, 53—54, 55—56 and 57—58 respectively, which are keyed, as indicated at 59, to the ends of sleeves, indicated by 60, which are rotatably mounted in openings 61 extending from face to face of the cut-down sides 31 and 32 of the block 6. Pairs of stub-shafts 62—63 and 64—65 having heads, as indicated by 66, at one end and nuts as 67 at their other end are loosely mounted in the sleeves 60 in alternate arrangement as shown. Each of the stub-shafts 62, 63, 64 and 65 are provided with longitudinal grooves, as indicated at 68, in which are arranged strips 69 and rollers 70 in order that the rotation of the shaft in one direction will cause rotation of the sleeve, but the shaft may be rotated in the other direction without causing rotation of said sleeve. Each of the stub-shafts 62—63 and 64—65 are rotated by means of suitable shaped pins, indicated by 71, which are fixed in the heads 66 of said stub-shafts and are arranged in a circle and extend radially on a spreading or outward inclination to constitute finger gears. Transverse opposite pairs of the pins 71 are adapted to travel, as the block 6 is rotated, in a central annular groove as 72, between teeth, indicated by 73, upon the inner surface of gear-rings 74 and 75, which are so supported in the housing 1 as to be capable of oscillatory movement, or said pins are adapted to engage the teeth 73, as the block 6 is rotated, when said gear-rings have been oscillated beyond their transverse center line. The teeth 73 are so arranged on the inner surface of the gear-rings 74 and 75, that when said gear-rings are in their rearwardly inclined or normal positions as shown in Figs. 3, 5 and 6, the central annular groove 72 is vertical and all of the teeth are parallel therewith. When the gear-rings 74 and 75 are in their rearwardly inclined or normal positions so that the transverse center of the central annular groove 72 coincides with the longitudinal centers of the stub-shafts 62—63 and 64—65, and transverse opposite pairs of the pins 71 travel in the central annular groove 72 of said gear-rings, there is no rotary movement of the stub-shafts 62—63 and 64—65; but when said gear-rings are oscillated forwardly beyond said rearwardly inclined or normal positions, the teeth 73 of said gear-rings are laterally engaged by said pins, and this causes oscillation of said stub-shafts. The oscillation of the stub-shafts 62—63 and 64—65 is transmitted to the worm-pinions 47—48 and 49—50, at the ends of the spindles 38 and 39, and through the worms 41 and 42 to the worm-wheel 43. This causes rotation of the hub 23 relative to the shaft 12 and the disc 22 at the end thereof, which causes rotation of the idler bevelled gears 16—17 and 26—27 upon the stationary axle 18, and in turn the bevelled gear 28 at the end of the driven shaft 29, thus driving the driven shaft at a speed relative to that of the engine or driving shaft 3 depending upon the amount of forward oscillation of the gear-rings 74 and 75 from their normal rearwardly inclined positions.

The gear-rings 74 and 75 are supported in bearings of the housing, so as to be capable of oscillation, by trunnions formed integrally with said gear-rings at 76—77 and 78—79 respectively, and securely fixed into the ends of the trunnions 76 and 78, by means of pins as at 80, are short shafts 81 and 82, which extend to the outside of the housing. Keyed to the projecting ends of the short shaft 81 is a foot-lever 83 for imparting oscillating movement to the gear-rings 74 and 75. Said foot-lever has a depending end 84, to which is connected a coiled spring 85 having its other end connected to a bracket 86 extending from the housing, and said coiled spring is adapted to force said foot-lever to its extreme right hand position against a stop 87 fixed into the housing. An arm 88 is keyed to the projecting end of the other short shaft 82, and this arm is connected to the foot-lever 83 by a link 89, so that movement of said foot-lever causes unison oscillatory movement of the gear-rings 74 and 75.

*Operation.*—Assuming that the foot-lever 83 is at its extreme rear or normal position against the stop 87 and the gear-rings 74 and 75 oscillated thereby are in the same position, the revolving of the driving shaft 3 will cause the revolving of the block 6, the shaft 12 keyed thereto and disc-gear 14 at the rear end of said shaft, and all parts carried by said block and shaft, and motion in the same direction and at the same speed will be transmitted from said driving shaft to the driven shaft 29. When the gear-rings 74 and 75 are in said position, the revolving of the block 6 causes the transverse opposite pins 71 of the finger-gears to travel in the central annular groove 72 of the gear-rings, and consequently no motion is transmitted by said gear-rings to said finger-gears, and the worms 41 and 42 being motionless and at right angles to the worm-wheel 43, serve as a locking means between the block 6 and the sleeve 23. When the foot-lever 83 is forced forward, the gear-rings 74 and 75 are correspondingly oscillated, and the revolving of the driving shaft 3 and block 6, causes the pins 71 of the finger-gears to engage the teeth 73 of the gear-rings and said finger-gears are revolved. This causes rotation of the stub-shafts 62—63 and 64—65, which transmit motion to the sleeves 60 through the roller clutches 70 and worms 51, 52, 53 and 54 at the ends thereof. Said worms cause rotation of the worms 47—48 and 49—50, thereby rotating the spindles 38 and 39 and the worms 41 and 42 fixed thereto. The worms 41 and 42 drive the worm-wheel 43, and thereby the sleeve 23 to which it is keyed, the disc 22 at the end of the sleeve and its peripheral flange 21 carrying the axle 18 are driven in the opposite direction and at a speed relatively slower to that of the driving shaft 3 or shaft 12 depending upon the distance the foot-lever is moved forward. When the hub 23 begins to rotate in the opposite direction to that of the shaft 12, the disc-gear 14 drives the gear-pinions 16—17 and 26—27, and the latter gear-pinions drive the bevelled gear 28 fixed to the driven shaft 29, and therefore said driven shaft revolves in said opposite direction at a relatively slower and retarded speed than the driving shaft 3. As the speed of the finger-gears increase with the forward movement of the foot-lever 83, the rotation of the hub 23 correspondingly increases until such speed is attained thereby as will neutralize the speed of and cause the bevelled pinions 16—17 and 26—27 to idle upon their axle 18, therefore the bevelled pinions 26—27 will roll freely upon the bevelled gear 28 and no motion will be transmitted to the driven shaft 29. A still further forward movement of the foot-lever 83 and corresponding oscillation of the gear-rings 74 and 75 causes a corresponding increase in the rotation of the finger-gears and the hub 23 as already described. From the point in the speed of the hub 23 where the bevelled pinions 16 and 17 are idle as stated, the increase in speed of said hub further increases the slowing up or retarded rotation of the hub 23 in the opposite direction and relative to that of the shaft 12, the disc 22, its peripheral flange 21, and the transverse axle 18 carried thereby; and consequently the bevelled pinions 16—17 are caused to rotate upon the transverse axle 18 by the driving action of the disc-gear 14. The motion from the bevelled pinions 26—27 is transmitted to the bevelled gear 28, and this causes the bevelled gear 28 and therefore the driven shaft 29 to revolve in the opposite direction to that before the bevelled gears 16 and 17 were idle. In short, in order to start the automobile, assuming that the engine is running and the driver is holding the foot-lever 83 in its vertical and central position, the rotation of the block 6 causes the finger-gears to rotate at their inter-mediate speed, and this motion is transmitted to the spindles 38 and 39, thence to the worm-wheel 43, and finally to the driven shaft 29, which is rotated in the same direction as the driving shaft 3 and at the slowest speed relative thereto, all as hereinbefore described, therefore transmitting the maximum power to the driven shaft for starting the automobile. As the driver releases the foot-lever 83, it is forced rearwardly by the action of the coiled spring 85, and the decrease in the speed of the rotation of the finger-gears correspondingly increases the speed of the driven shaft 29 until the foot-lever is against the stop 87, when the driven shaft is revolved in unison with the driving shaft 3 according to the speed of the engine. When the driver desires to stop the automobile, the foot-lever is forced forward to its central vertical position, and when it is desired to back the automobile, the driver forces the foot-lever forward beyond its central vertical position, and just as soon as the foot-lever begins to move beyond said point, the driven shaft 29 begins to revolve slowly in the opposite direction and at the maximum of power, and increases in speed with the continued forward movement of the foot-lever.

From the drawings and description, it will be seen that a speed changing mechanism constructed in accordance with this invention will permit the starting of an automobile by the simple operation of moving a lever in a straight line direction, and that said mechanism is simple in construction, compact and practical, and is easily manipulated. It will be understood that this speed changing mechanism is not for automobiles only but may be used in connection with and applied to all classes of variable speed machines. Although the mechanism disclosed is well adapted to accomplish the purpose intended, it will be understood that slight changes in the details of construction may be made for carrying out the invention within the scope of the claims.

Having fully described my invention, what I claim is:

1. In a speed changing mechanism, the combination of a driving member, a gear rotatable with the driving member, means rotatably mounted upon the driving member, idler-gears carried by said means and engaging said gear, means for imparting the motion of the idler-gears to the driven member, a worm-wheel fixed to the first mentioned means, a worm supported by the driving member in engagement with said worm-wheel, a finger-gear consisting of a head carrying a plurality of pins for causing rotation of the worm, a ring-gear adapted to be engaged by said pins of the finger-gear for causing rotation of the finger-gear, and means for manually actuating the ring-gear to cause it to change the speed of rotation of said finger-gear, substantially as described.

2. In a speed changing mechanism, the combination of a driving member, a gear rotatable with the driving member, means rotatably mounted upon the driving member, idler-gears carried by said means and engaging said gear, means for imparting the motion of the idler-gears to the driven member, a worm-wheel fixed to the first mentioned means, a worm supported by the driving member in engagement with said worm-wheel, a finger-gear consisting of a head carrying a plurality of pins for causing rotation of the worm, a ring-gear adapted to be engaged by said pins of the finger-gears for causing rotation of the finger-gear, the ring-gear being oscillatory supported, and means for manually actuating the ring-gear, substantially as described.

3. In a speed changing mechanism, the combination of a driving member, a gear rotatable with the driving member, means rotatably mounted upon the driving member, idler-gears carried by said means and engaging said gear, means for imparting the motion of the idler-gears to the driven member, a worm-wheel fixed to the first mentioned means, a worm supported by the driving member in engagement with said worm-wheel, finger gears consisting of a head carrying a plurality of pins for causing rotation of the worm, a ring-gear adapted to be engaged by said pins of the finger-gears for causing rotation of the finger-gears, the ring-gear being oscillatory supported, means for manually actuating the ring-gear in one direction, and means for automatically actuating the ring-gear in the opposite direction, substantially as described.

4. In a speed changing mechanism, the combination of a driving member, a block fixed to the driving member, a shaft fixed to the block, a disc-gear fixed to the shaft, a hub rotatably mounted upon the shaft, a transverse axle carried by the hub, idler-pinions on the transverse axle and in mesh with said disc-gear, a driven member, a gear fixed to the driven member and in mesh with the idler-pinions, a worm-gear fixed to the hub, spindles rotatably supported by the block, worms fixed to the spindles and in mesh with said worm-wheel at right angles thereto, sleeves rotatably mounted in said block, stub-shafts rotatably mounted in said sleeves, means for causing rotation of said sleeves, means for transmitting the motion of said stub-shafts to said spindles, and means for allowing said stub-shafts to remain stationary or causing them to be revolved by rotation of the driving member, substantially as described.

5. In a speed changing mechanism, the combination of a driving member, a block fixed to the driving member, a shaft fixed to the block, a disc-gear fixed to the shaft, a hub rotatably mounted upon the shaft, a transverse axle carried by the hub, idler-pinions on the transverse axle and in mesh with said disc-gear, a driven member, a gear fixed to the driven member and in mesh with the idler-pinions, a worm-wheel fixed to the hub, spindles rotatably supported by the block, worms fixed to the spindles and in mesh with said worm-wheel at right angles thereto, worm-pinions at the ends of the spindles, stub-shafts, the stub-shafts being rotatably mounted in sleeves, the sleeves being rotatably mounted in said block, means whereby the motion of the stub-shafts will be transmitted to the sleeves when the stub-shafts are rotated in one direction but not in the other, worm-gears fixed to said sleeves and in mesh with said worm-pinions, and means for allowing said stub-shafts to remain stationary or cause them to be rotated by rotation of the driving member, substantially as described.

6. In a speed changing mechanism, the combination of a driving member, a block fixed to the driving member, a shaft fixed to the block, a disc-gear fixed to the shaft, a hub rotatably mounted upon the shaft, a transverse axle carried by the hub, idler-pinions on the transverse axle and in mesh with said disc-gear, a driven member, a gear fixed to the driven member and in mesh with the idler-pinions, a worm-wheel fixed to the hub, spindles rotatably supported by the block, worms fixed to the spindles and in mesh with said worm-wheel at right angles thereto, worm-pinions at the ends of the spindles, stub-shafts, the stub-shafts being rotatably mounted in sleeves, the sleeves being rotatably mounted in said block, means whereby the motion of the stub-shafts will be transmitted to the sleeves when the stub-shafts are rotated in one direction but not in the other, worm-gears fixed to said sleeves and in mesh with said worm-pinions, finger-gears at the ends of the stub-shafts, a gear-ring, the gear-ring being adapted to be moved for allowing said finger-gears to remain stationary or cause them to be rotated by rotation of the driving member, substantially as described.

7. In a speed changing mechanism, the combination of a driving member, a block fixed to the driving member, a shaft fixed to the block, a disc-gear fixed to the shaft, a hub rotatably mounted on the shaft, a transverse axle carried by the hub, idler-pinions upon the transverse axle and in mesh with said disc-gear, a driven member, a gear fixed to the driven member and in mesh with the idler-pinions, a worm-wheel fixed to the hub, spindles rotatably supported by the block, worms fixed to the spindles and in mesh with said worm-wheel at right angles thereto, worm-pinions at the ends of the spindles, stub-shafts, the stub-shafts being rotatably mounted in sleeves, the sleves being rotatably mounted in said block, means whereby the motion of the stub-shafts will be transmitted to the sleeves when the stub-shafts are rotated in one direction but not in the other, worm-gears fixed to said sleeves and in mesh with said worm-pinions, finger-gears at the ends of the stub-shaft, a gear-ring, the gear-ring being adapted to be moved for allowing said finger-gears to remain stationary or causing them to be rotated by rotation of the driving member, means for manually moving the gear-ring in one direction, and means for automatically returning the ring-gear to its original position, substantially as described.

In testimony whereof I affix my signature.

ROBERT B. BEAUCHAMP.